3,639,591
METHOD FOR DESTROYING SOIL NEMATODES
David L. Gerwitz and John P. Chupp, Kirkwood, Mo., assignors to Monsanto Company, St. Louis, Mo.
No Drawing. Filed Sept. 18, 1969, Ser. No. 859,178
Int. Cl. A01n 9/36
U.S. Cl. 424—216        6 Claims

ABSTRACT OF THE DISCLOSURE

Nematocidal usage of O-methyl S-(4-chlorophenylthiomethyl) methylphosphonodithioate.

---

This invention relates to the nematocidal usage of O-methyl S-(4-chlorophenylthiomethyl) methylphosphonodithioate

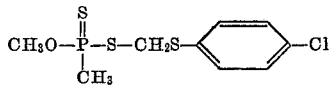

an amber oil, prepared by refluxing equimolecular proportions of 4-chlorophenylthiomethylchloride and ammonium O-methyl methylphosphonodithioate in benzene.

To illustrate the activity of the compound of this invention is the following:

(1) To an aqueous suspension containing 10 p.p.m. of O-methyl S-(4-chlorophenylthiomethyl) methylphosphonodithioate in a glass vial is added freshly hatched larvae of the vinegar eel worm, *Turbatrix aceti*, and the vial stoppered. After 24 hours at room temperature complete destruction was observed. In contrast O,O-diethyl S-(4-chlorophenylthiomethyl) phosphonodithioate at the same concentration and under the same evaluating conditions was completely inactive;

(2) To approximately 400 grams of a sandy loam soil infested with the larvae of the tomato root knot nematode, *Meloidogyne javanica*, is added and intimately mixed 0.02 grains of O-methyl S-(4-chlorophenylthiomethyl) methylphosphonodithioate. This mixture is placed in a one pint Mason jar, the jar capped, and permitted to stand for 7 days at room temperature. The soil is then potted and allowed to aerate for 7 days at room temperature. Seedling tomato plants are then transplanted in the aerated potted soil. After 4 weeks the plants were removed and examination thereof showed no nematode damage. In contrast the control plants were severely damaged by the nematode.

In actual usage the compound of this invention is added to the soil in solution, as an emulsion or water dispersion but preferably is added in a solid formulation wherein the active nematocide is distributed over some dry and permanently free-flowing powder such as the clays, including bentonite and attapulgite or such materials as talc, diatomaceous earth, fuller's earth, chalk, calcium carbonate and the like. These diluents possess the added advantage of lower cost treatment since normally they comprise more than 50% up to 98% of the complete formulation and thereby provide a means of more even distribution of the active material over a wider area and in the effective quantities required. These nematocidal compositions will of course attack the soil phase of the life cycle of nematode parasites which infest animals. Treating barnyards, chicken pens, stable and other infested areas destroys eggs and infestive larvae of many parasites which infest animals.

In the use of the compound of this invention as nematocides the active compound, diluted or undiluted, can be applied to the soil at rates of 5 to 100 pounds per acre. The preferred application for treating soils of average nematode infestation will be from 10 to 50 pounds per acre. The formulation may contain dispersants which aid uniform distribution.

What is claimed is:

1. A method of destroying nematode parasites which comprises contacting said nematode parasites with a nematocidally effective amount of O-methyl S-(4-chlorophenylthiomethyl) methylphosphonodithioate.

2. The method of claim 1 wherein the nematode parasites are present in the soil and the phosphonodithioate is employed at the rate of 5 to 100 pounds per acre.

3. The method of claim 1 wherein O-methyl S-(4-chlorophenylthiomethyl) methylphosphonodithioate is added in a formulation consisting essentially of said compound and a diluent in the amount of from 50 percent to 98 percent of the complete formulation.

4. The method of claim 3 wherein said diluent is water and said compound is dispersed therein.

5. The method of claim 3 wherein said diluent is a dry and permanently free-flowing powder.

6. The method of claim 5 wherein said diluent is a clay.

References Cited

UNITED STATES PATENTS

| | | | |
|---|---|---|---|
| 2,793,224 | 5/1957 | Fancher | 424—216 X |
| 3,025,316 | 3/1962 | Lorenz et al. | 424—216 X |
| 3,060,217 | 10/1962 | Schrader | 424—216 X |
| 3,081,328 | 3/1963 | Lorenz et al. | 424—216 X |
| 3,159,665 | 12/1964 | Blair | 424—216 X |
| 3,277,216 | 10/1966 | Schrader | 260—949 X |
| 3,485,918 | 12/1969 | Botts et al. | 424—216 |

ALBERT T. MEYERS, Primary Examiner

L. SCHENKMAN, Assistant Examiner

U.S. Cl. X.R.

260—949